(12) United States Patent
Rayburn

(10) Patent No.: US 6,550,840 B2
(45) Date of Patent: Apr. 22, 2003

(54) TAILGATE LIFT ASSEMBLY

(75) Inventor: David Rayburn, Elizabeth, IN (US)

(73) Assignee: Backsaver Incorporated, Jeffersonville, IN (US)

( * ) Notice: Subject to any disclaimer, the term of this patent is extended or adjusted under 35 U.S.C. 154(b) by 0 days.

(21) Appl. No.: 09/924,176

(22) Filed: Aug. 7, 2001

(65) Prior Publication Data

US 2002/0070576 A1 Jun. 13, 2002

Related U.S. Application Data

(63) Continuation of application No. 09/675,042, filed on Sep. 28, 2000, now abandoned, which is a continuation of application No. 09/473,077, filed on Dec. 28, 1999, now Pat. No. 6,126,223.

(51) Int. Cl.⁷ .................................................. B60P 1/267
(52) U.S. Cl. ........................................ 296/57.1; 296/61
(58) Field of Search ........................... 296/50, 57.1, 61; 414/537

(56) References Cited

U.S. PATENT DOCUMENTS

| | | |
|---|---|---|
| 942,888 A | 12/1909 | Cooke |
| 2,184,814 A | 12/1939 | Nagamatsu |
| 2,328,082 A | 8/1943 | Lawrence |
| 2,605,494 A | 8/1952 | Lyons, Jr. et al. |
| 2,653,845 A | 9/1953 | Benjamin |
| 2,856,710 A | 10/1958 | Hastings |
| 2,955,863 A | 10/1960 | Olender |
| 3,009,732 A | 11/1961 | Brown |
| 3,104,910 A | 9/1963 | Kappen |
| 3,303,613 A | 2/1967 | Seuntjens |
| 3,972,428 A | 8/1976 | Love, Jr. et al. |
| 4,165,121 A | 8/1979 | Hori et al. |
| 4,601,485 A | 7/1986 | Furchak |
| 4,792,274 A | 12/1988 | Cockram |
| 4,887,393 A | 12/1989 | Cysewski |
| 5,954,383 A | 9/1999 | Beck et al. |
| 6,126,223 A | 10/2000 | Rayburn |
| 6,196,609 B1 * | 3/2001 | Bowers ..................... 296/57.1 |

FOREIGN PATENT DOCUMENTS

| | | |
|---|---|---|
| GB | 309693 | 4/1929 |
| GB | 510464 | 8/1939 |
| GB | 690940 | 4/1953 |
| NL | 7407939 | 12/1975 |

\* cited by examiner

Primary Examiner—Joseph D. Pape
(74) Attorney, Agent, or Firm—John F. Salazar; Middleton Reutlinger

(57) ABSTRACT

A tailgate lift assembly is described herein wherein the assembly is comprised of a housing which has retained therein a spring, the spring being connected to the tailgate by means of a cable. The cable extends from the spring through at least one roller for correct positioning thereof. The cable is biased due to the spring the tension of which is adjustable through the use of a tensioning mechanism such as a turnbuckle. The lift assembly may be integrated with the top of a trailer side rail or may be affixed thereto.

18 Claims, 6 Drawing Sheets

TAILGATE LIFT ASSEMBLY

This application is a continuation of application Ser. No. 09/675,042 filed Sep. 28, 2000, now abandoned, which is a continuation of 09/473,077 filed on Dec. 28, 1999. now U.S. Pat. No. 6,126,223.

BACKGROUND OF THE INVENTION

1. Field of the Invention

The present invention relates to a tailgate lift assembly and particularly to a device which allows a tailgate which is hingedly attached to a trailer to be raised and lowered with relative ease due to the biasing of the lift assembly.

2. Description of the Prior Art

Prior art tailgate lift assemblies which are being utilized in combination with a trailer and tailgate typically use hydraulics or other cantilevered pivot arms in order to aid in the raising and lowering of the tailgate. These prior art tailgate lift assembly devices further traditionally require integration into the side wall or bed of the trailer in order to adequately provide biasing of the tailgate in the upward or downward direction. Such biasing allows the tailgate to be raised and lowered with relative ease.

However, the integration of the biasing devices into the side-rail or bed of the trailer proves to be difficult in the manufacturing of the trailer device or in modifying of the trailer device due to the structure of the pivoting arms or the inclusion of the hydraulic support cylinders.

Further devices have provided a mechanism for lifting tailgates wherein cables may be utilized, but which must necessarily be positioned such that interference in the truck bed is required. U.S. Pat. No. 4,601,485 discloses such a mechanism wherein a cable interferes with a trailer hitching device for a fifth wheel vehicle in order to actuate raising and lowering of the tailgate.

Other mechanisms are known which combine spring type devices and hydraulic means for raising and lowering gates from a vertical and horizontal position. U.S. Pat. No. 3,303,613 discloses utilization of multiple spring devices in addition to hydraulic cylinders in order to provide biasing means for raising and lowering of the gate. However, utilization of the above-listed devices proves to be unusable in combination with a trailer due to proper positioning of the material elements and the inability of integrating these elements with a standard trailer bed and side rail.

These and other devices of the prior art fail to be easily integrated with presently existing trailers and require extensive engineering and manufacturing at the time of assembly of the trailer.

In the prior art, there does not exist a simplified unit for providing a tailgate lift assembly which works in combination with the trailer and the tailgate such that the lift assembly is integrated with the trailer side-rail, which provides adequate biasing of the tailgate for relative ease of raising and lowering the tailgate and which may be readily integrated with existing trailer side-rails.

SUMMARY OF THE INVENTION

The present invention resolves the above disclosed drawbacks of the prior art devices. The tailgate lift assembly of the present invention provides a means to bias a tailgate from the trailer utilizing a lift assembly wherein the assembly is provided along the side-wall or rail of the trailer. The lift assembly is connected to the tailgate through use of a cable which is properly biased through utilization of a spring and multiple rollers. The design of the present invention allows for a lift assembly to be readily integrated with existing trailers and also provides a relatively inexpensive design which may be utilized in the original manufacturing of the trailer such that relatively easy manufacturing may be found.

The tailgate lift assembly of the present invention combines utilization of a biasing spring in a housing member, the housing member being placed on the upper portion of the trailer side rail. The housing contains therein the biasing spring which is anchored within the housing and connected to the tailgate by a cable. The cable may be intertwined around a first and a second roller so that upon raising and lowering of the tailgate the cable may move axially within the housing with relative ease. Further, provided at the attachment point of the cable to the tailgate, adjustment means may be provided such that the length and thereby the tension of the cable may be readily adjusted.

It is therefor an object of the present invention to provide a tailgate lifting assembly which may be readily integrated with the side-rail of an existing trailer.

It is a further object of the present invention to provide a tailgate lift assembly which allows for relatively easy manufacturing and integration with both the trailer and the tailgate such that overly burdensome hydraulic mechanisms or pivoting arms are not required.

An additional object of the present invention is to provide a tailgate lift assembly wherein a biasing spring is operably connected to the tailgate through use of a cable and wherein the cable is subjected to a guiding mechanism such that it may readily slide axially within the interior of the housing.

An additional object of the present invention is to provide a mechanism for adjusting the length of the cable such that the amount of biasing and tension within the tailgate lift assembly may be changed.

A further object of the present invention is to provide a tailgate lift assembly which can be readily integrated with existing trailers by application onto the side-rail of the trailer thereby connecting the tailgate to the side-rail with a biased cable. Thus, trailers which do not have any lifting assemblies located thereon may be readily retrofitted with the tailgate lift assembly of the present invention.

BRIEF DESCRIPTION OF THE DRAWINGS

In order that the invention may be clearly understood and readily carried into effect, the invention will now be described, by way of example with reference to the accompanying drawings and wherein.

DETAILED DESCRIPTION OF THE PREFERRED EMBODIMENT

Figure 1:
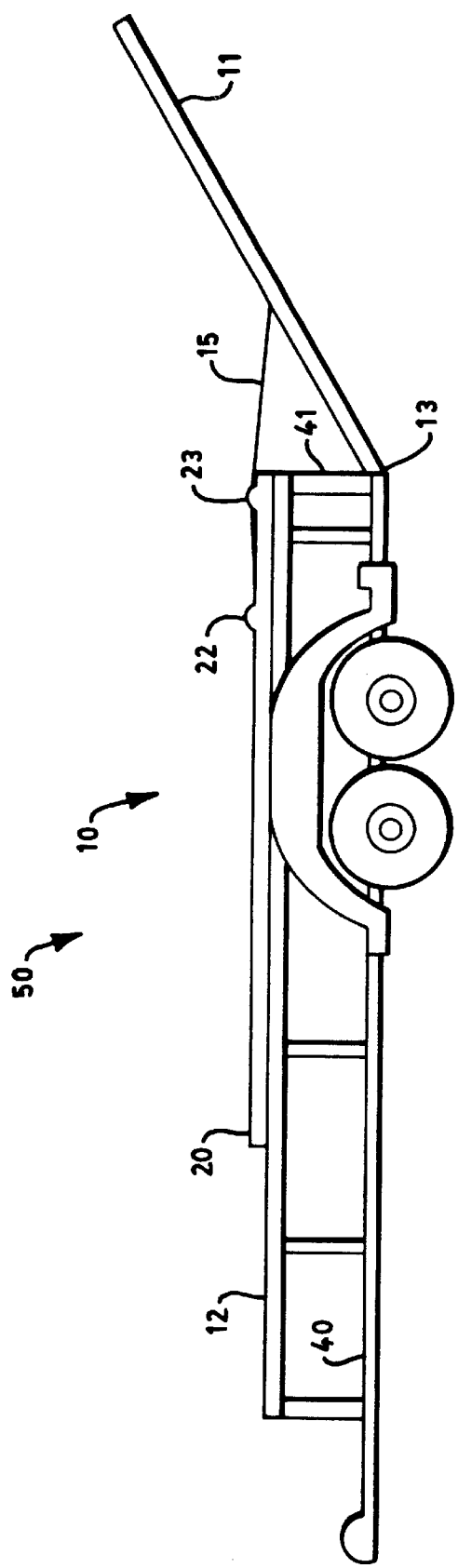
FIG. 1 is a side view of the tailgate lift assembly and trailer combination of the present invention.

The tail gate lifting assembly 10 of the present invention in combination with the trailer 50 to which is attached is shown in FIG. 1. As disclosed therein, the trailer 50 is comprised of trailer side-rail 12, tailgate 11, and hinge connection 13 between the tailgate 11 and trailer bed 40. Further, the lifting assembly 10 is shown attached to the top portion of trailer side-rail 12 wherein the housing 20 of the lifting assembly 10 is shown. Retained within the housing and visible from the side view shown in FIG. 1 is first roller 22 and second roller 23. Also detailed in FIG. 1 is the cable 15 which attaches the tailgate 11 to the trailer side-rail 12 in such a manner that the cable 15 is biased to aid in raising and lowering tailgate 11. Hinge 13 between the tailgate 11 and trailer bed 40 allows the tailgate to be rotated about an axis point which is along the back edge of trailer bed 40 coadjacent with the lower portion of tailgate 11. The lift assembly 10 as is shown aids in both the raising and lowering of tail gate 11 through a biased cable 15 such that little effort is required in order to raise and lower the tailgate 11.

Not shown in FIG. 1, but typically found in trailer designs are latch means to connect the tailgate 11 to the rear post support member 41 of the trailer side-rail 12 in such a manner that the tailgate, when placed in the raised position, is locked in the upward position. Such locking mechanism prevents the tailgate 11 from being lowered unless it is unlatched. These locking mechanisms may be readily integrated with the tailgate assembly and trailer presently described.

Figure 2:
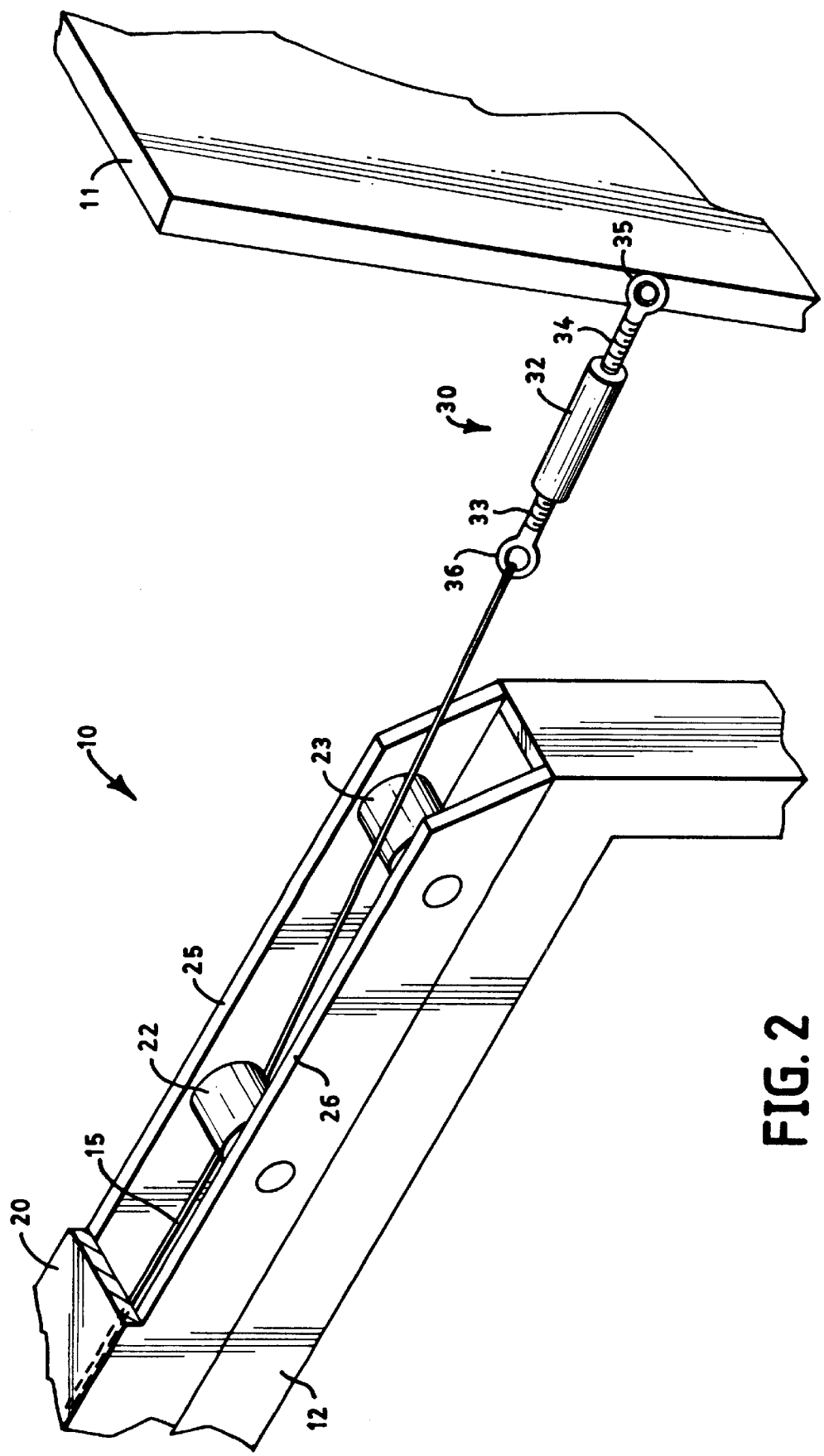
FIG. 2 is an upper perspective view of the tailgate lift assembly of the present invention.

A more clearly depicted disclosure of the lifting assembly 10 of the present invention is shown in FIG. 2 wherein the lifting assembly 10 is attached to the upper portion of trailer side-rail 12. As is shown in FIG. 2, the tailgate lifting assembly 10 is securely affixed to the top section of trailer side-rail 12. However, it may be readily apparent to those of ordinary skill in the art that the lifting assembly 10 may be fully integrated within the top portion of trailer rail 12 such that the assembly 10 is coextensive with the top portion of the rail.

As is shown in FIG. 2, the lifting assembly 10 is comprised of a housing 20 which retains therein several elements of the lifting assembly 10. Extending rearwardly is cable 15 which securely attaches the tailgate 11 to the trailer side rail 12. The cable 15 may be a stainless steel cable capable of withstanding high pound force such as a two-thousand-pound steel cable. Additionally, as can be seen from the perspective view of FIG. 6 and top view of FIG. 4, two cables are utilized to secure the tailgate 11 to the trailer 50. Thus, upon accidental breakage of one cable, the remaining cable will have sufficient strength to still retain the tailgate 11 in the upward position.

Returning to FIG. 2, cable 15 extends rearwardly from the housing 20 to the tailgate 11. In combination with FIG. 2, FIG. 3 additionally discloses the makeup of the secure attachment of the cable 11 to the housing 20. In reference to both FIGS. 2 and 3, a turnbuckle 30 is utilized at the rearward most end of cable 30 directly adjacent to tailgate 11. Turnbuckle 30 is comprised of a cylindrical collar 32 which has threaded openings on either end. Inserted into each threaded opening are first pin 33 and second pin 34. First pin 33 is designed such that eyelet 36 extends rearwardly for attachment to cable 15 and has on its opposite end a threaded portion which is threadably received into collar 32. Additionally, extending from the other side of collar 32 is second pin 34 which has eyelet 35 extending rearwardly therefrom and a treaded neck portion which extends internally into collar 32. Utilization of turnbuckle 30 allows the user to adjust the length and tension of cable 15 as well as the amount of eventual force required for raising and lowering the tailgate 11.

The amount of force required in the biasing of cable 15 may be significant in that the tailgate 11 found on many typical trailers can be exceptionally heavy. It is not uncommon to find a tailgate which weighs in excess of two hundred pounds. Thus the cable 15 must be biased and tension in such a way so that the user may, with relative ease, raise and lower the heavy tailgate. Adjustment of the tension, the origin of which will be described herein, may thus be accomplished through utilization of turnbuckle 30 and collar 32.

Figure 3:
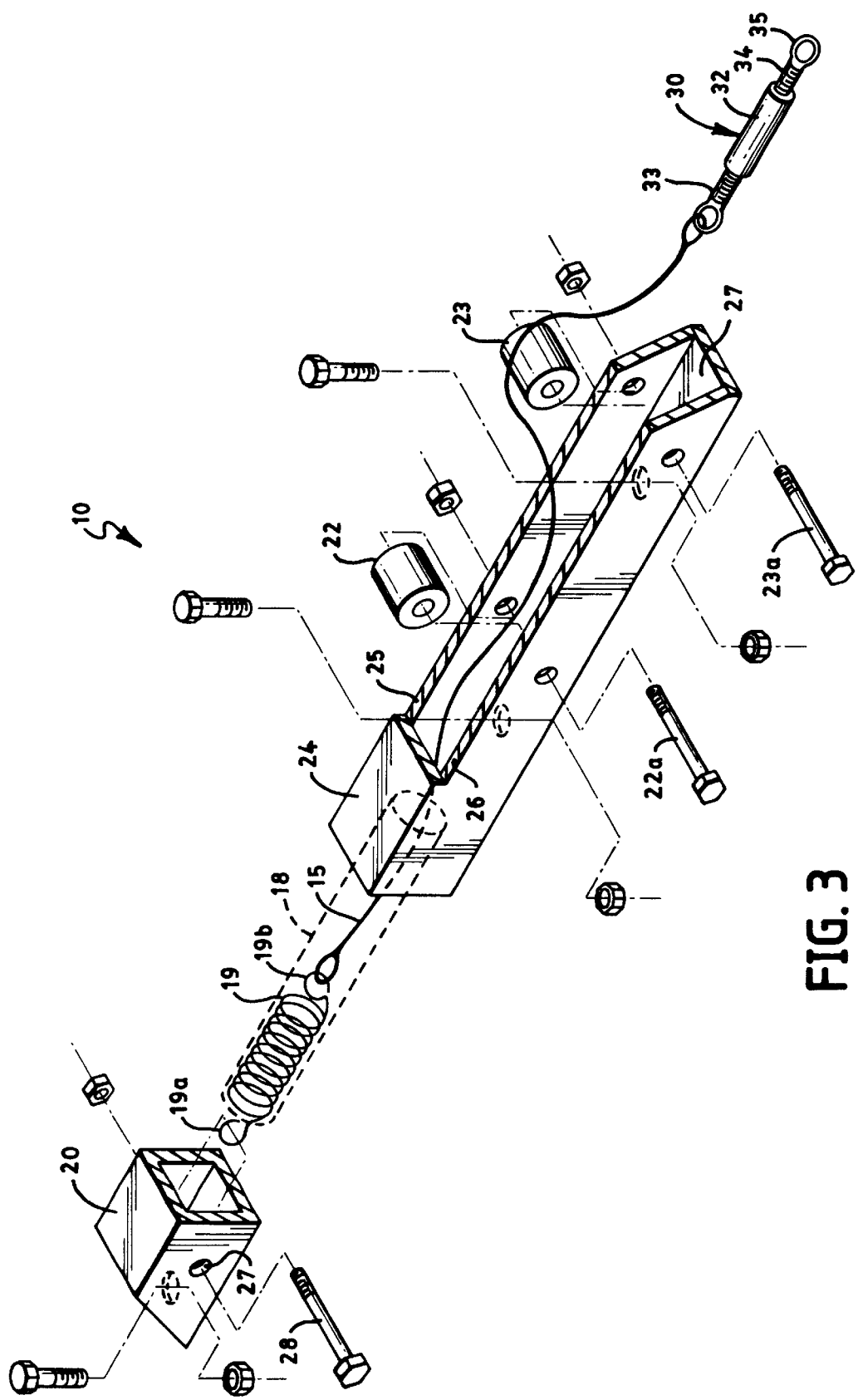
FIG. 3 is an exploded view of the tailgate lift assembly of the present invention.

Turning back to the lifting assembly 10 disclosed in FIGS. 2 and 3, it may be seen that the cable is biased by spring 19. Spring 19 is retained within housing 20 through the use of anchoring bolt 28. The spring 19 can be a standard steel spring capable of providing about 150 pounds of force. As shown in FIG. 3, the spring is retained within housing 20 by anchoring bolt 28 which extends through an attachment eyelet 19a or other standard affixing mechanism utilized for high tension springs.

At the opposite end of spring 19 is securely affixed the forward end of cable 15 through spring attachment eyelet 19b. The cable 15 is attached such that spring 19, securely anchored to housing 20, biases the tension on cable 15 such that rearward axial movement of the cable 15 causes high tension to appear thereon, biasing the spring to return in its untensioned position. Thus, the cable 15 will have significant tension biasing the cable in the forward position such that the tailgate 11 to which it is attached will want to raise. However, such tensioning may be adjusted so that the tailgate 11 will only raise upon upward force applied thereto. Such adjustment to the tensioning is provided through turnbuckle 30 previously disclosed herein. The adjustments provided may be finely tuned such that a minimal amount of upward force need be provided before the tailgate begins its upward movement. Thus, tensioning may be fine tuned to a point where only 5 to 10 pounds of force may be required to raise the relatively heavy tailgate 11 which is hingedly attached to trailer bed 40 through hinge 13.

Returning to both FIGS. 2 and 3, it is apparent therein that cable 15 utilizes a first and second roller 22 and 23. The rollers 22 and 23 provide a guiding mechanism by which the cable 15 may move axially within the housing 20 and rearward therefrom with relative ease. Rollers 22 and 23 is are securely affixed between lifting assembly side-wall 26 and sidewall 25. First roller 22 is rotatably affixed to sidewalls 25 and 26 through roller pin 22a. Second roller 23 is rotatably affixed to sidewall 25 and 26 throughout the use of roller pin 23a. Both rollers 22 and 23 are rotatable within the area between sidewalls 25 and 26.

Figure 6:
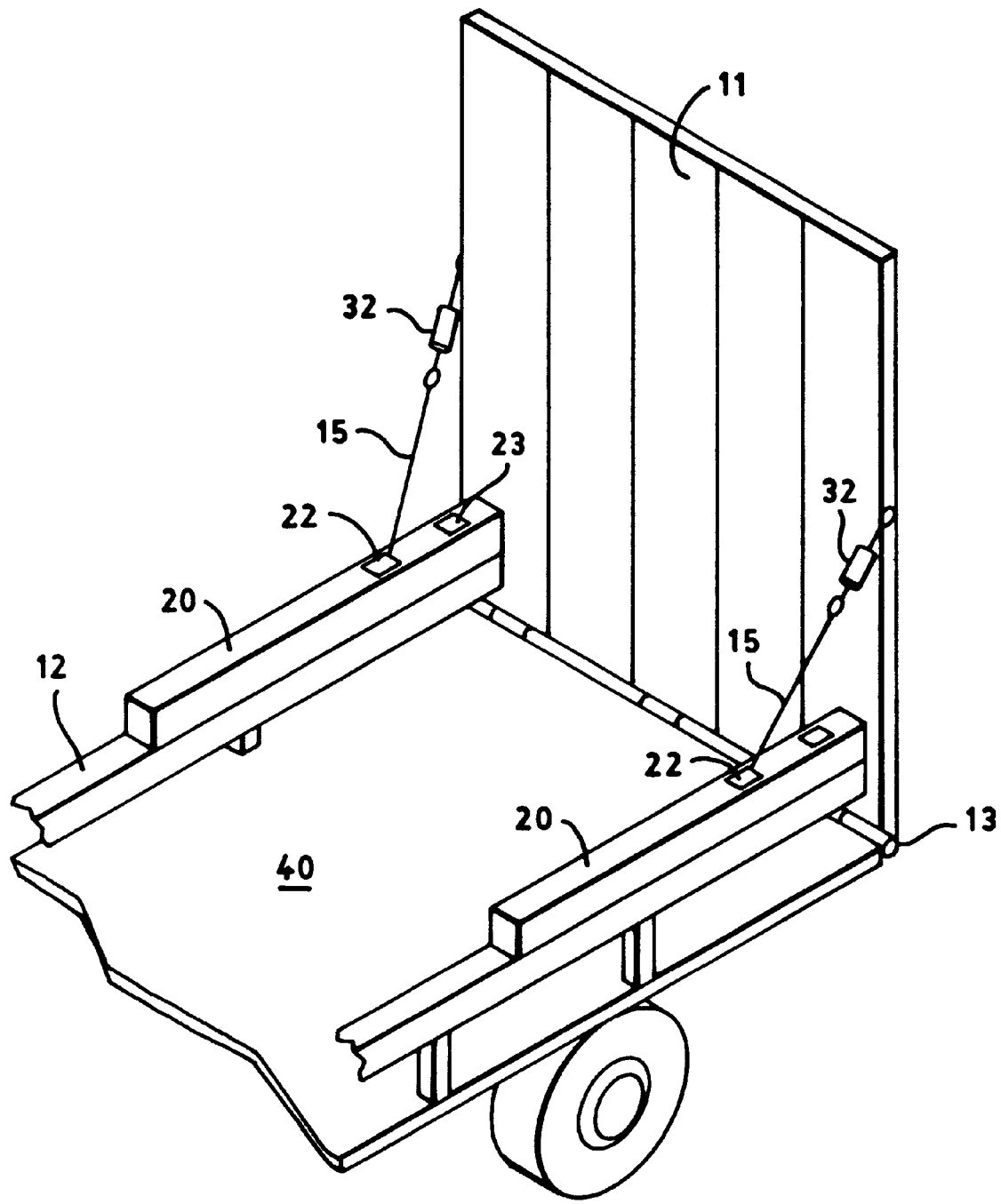

As can be seen in both FIG. 2 and FIG. 3, the top wall 24 of assembly housing 20 is shortened and removed from a point just before the placement of first roller 22. Top wall 24 of housing 20 does not extend completely to the rearward portion of housing 20 since cable 15 must extend upwardly outside of the area of containment of housing 20, as can be seen in FIG. 6, at a point in between roller 22 and roller 23. Thus, when the tailgate 11 is in the fully raised position, cable 15 will extend upward at an angle from first roller 22 to a point in contact with tailgate 11.

Returning to FIG. 2 and FIG. 3, cable 15 extends underneath first roller 22 and above second roller 23. As the tailgate 11 is lowered from its raised position, roller 22 will allow the cable 15 to move rearwardly thereunder through rotational movement and due to the tensions caused by spring . At some point during lowering of the tailgate 11, cable 15 will come into contact with second roller 23 which will additionally aid in lowering the tailgate 11 by placing downward force on second roller 23 once in contact with cable 15. As the tailgate 11 is further lowered, both first roller 22 and second roller 23 rotate aiding in the rearward movement of cable 15. Once in the fully lowered position, cable 15 will extend again below roller 22, above roller 23 and downward therefrom at an angle determined by the position of connection of cable 15 on the trailer tailgate 11 side-rail member.

Returning to FIG. 3, it may be seen that spring 19 is housed within assembly housing 20. Anchoring bolt 28 extends through aperture 27 in order that the attachment eyelet 19a may be anchored in place within housing 20. Spring 19 is retained completely withiri housing 20 providing an additional safety factor therein. Further, spring 19 is surrounded by plastic tubing or sleeve 18 which extends rearward from the spring toward the tailgate a distance which covers the amount of extension of the spring 19 when the tailgate 11 is placed in the lowered position. Plastic tubing 18 surrounds spring 19 such that as the spring is tensioned by lowering of tailgate 11, the high tension spring will not come into contact with the interior of housing 20 thereby causing frictional noises or other undesirable characteristics. Tubing 18 additionally protects the spring 19 and retains it appropriately within housing 20. The spring 19 may extend approximately 18 inches in length and may, upon full tensioning of lowering of the tailgate 11 extend rearward approximately double that original untensioned length.

As is additionally shown in FIG. 3, the housing 20 is provided with means for attachment to the top portion of trailer sidewall 12. A plurality of apertures are found on the bottom portion of housing 20 such that the housing 20 may be securely affixed to the trailer side rail 12. Standard bolts may be applied thereto or the housing 20 may be affixed utilizing welding or other commonly known techniques. As has also been previously disclosed, the lifting assembly 10 may be fully integrated within the top portion of trailer side-rail 12 such that it is integral therewith.

Figure 4:
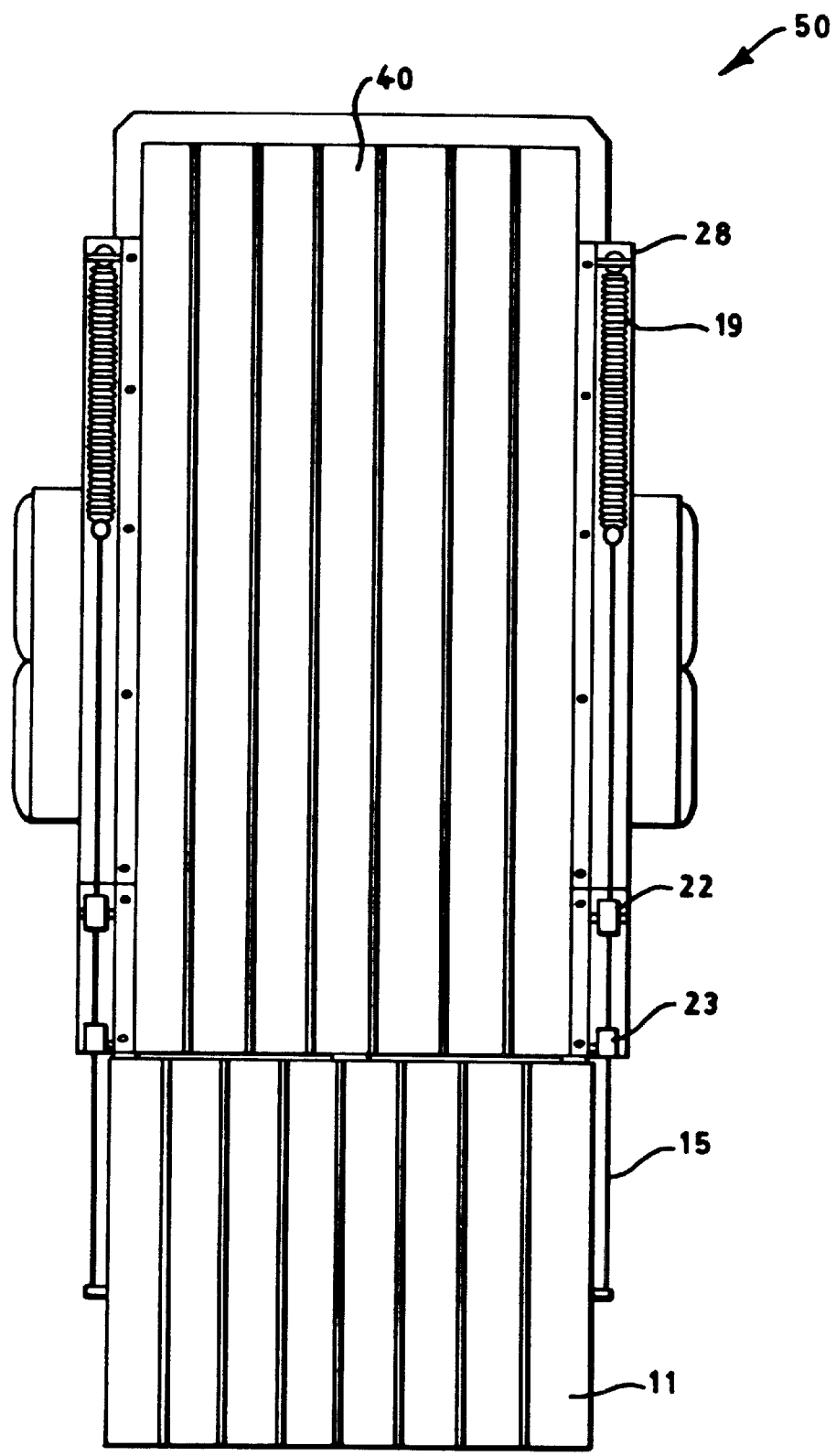
FIG. 4 is a top view of the tailgate lift assembly and trailer combination of the present invention.

Turning to FIG. 4, a top view of the lifting assembly 10 of the present invention is disclosed in combination with the trailer 50. Tailgate 11 is shown in the open position wherein cable 15 extends rearwardly from the tailgate over rollers 22 and 23 and into the housing 20. Spring 19 is securely affixed to the cable 15 and is anchored to the housing by anchoring bolt 28. As shown therein, the spring 19 is tensioned to its fully extended position thereby biasing the cable 15 and causing the tailgate to be readily lifted.

Figure 5:
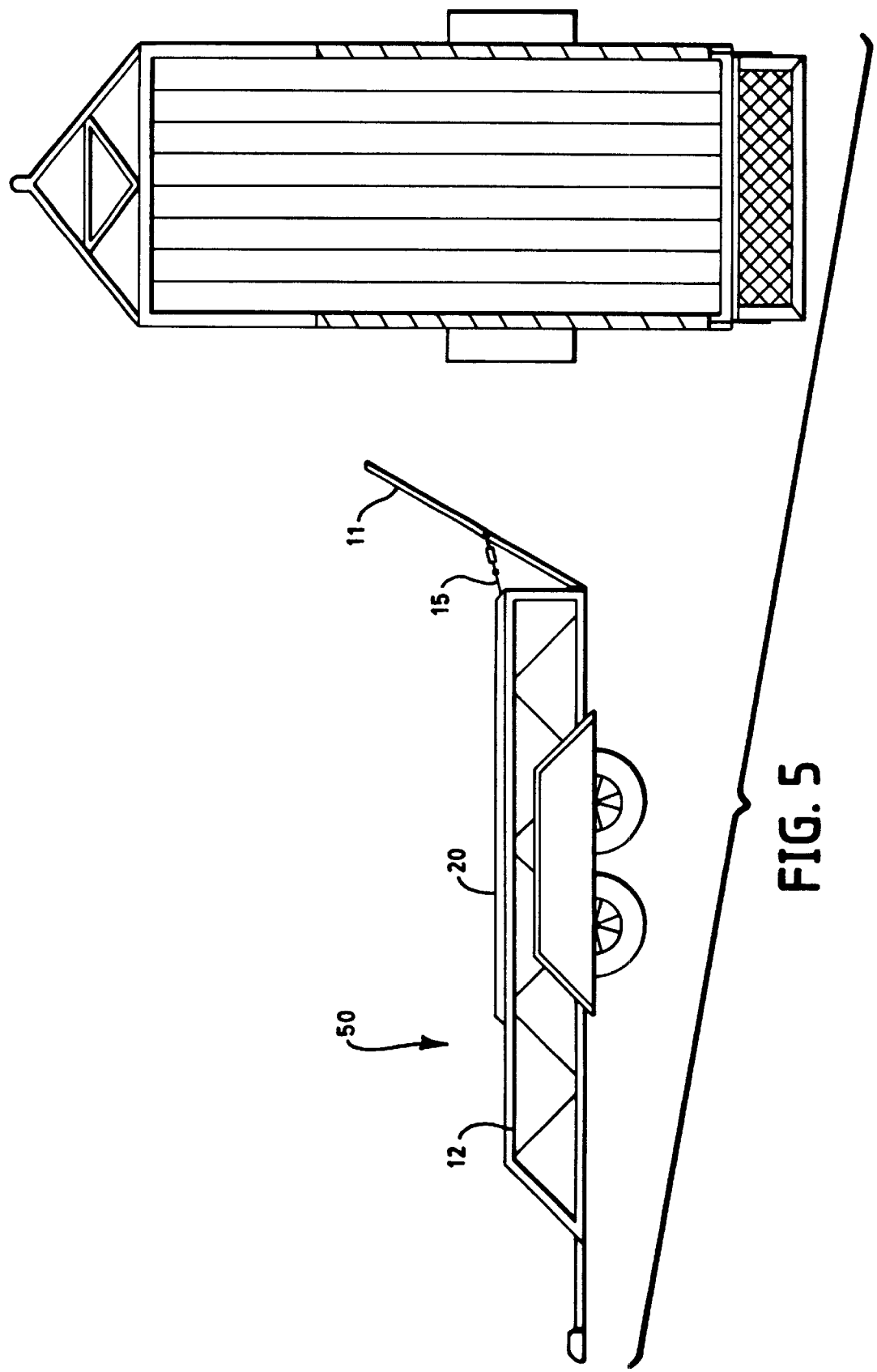
FIG. 5 is a side view of the tailgate lift assembly and trailer of the present invention; and, FIG. 6 is a perspective view of the trailer and tailgate lift assembly with the tailgate in the closed position.

Turning to FIG. 5, the tailgate 11 is shown in the half raised position where from the side view it is apparent that cable 15 will soon extend upward over the housing sidewalls 25 and 26. As is shown in FIG. 6, the tailgate 11 is in the fully raised position and the cable extends upward from the first roller 22 to the tailgate which is in the raised and locked position. Tailgate 11 rotates about hinge 13 and turnbuckle 30 allows, as previously mentioned, adequate adjustment of tensioning for spring 19. Spring 19, while not shown in FIG. 6, is now in the slightly untensioned position while still maintaining adequate forward force on cable 15 thereby causing the tailgate 11 to be maintained in the raised position. Additionally, not shown, the tailgate 11 may be locked into place through locking mechanisms affixed to the end portion of side-rail 12 and the side-rails of the tailgate.

What is claimed is:

1. A tailgate lifting assembly, comprising:
   a housing having a pre-determined length;
   a spring having a first and a second end and anchored to said housing at said first end;
   a cable having a first and a second end, said first end affixed to said second end of said spring and capable of stretching said spring, said cable extending substantially through said housing; and,
   at least one roller affixed to said housing, said cable extending around said at least one roller, said housing surrounding said spring from said housing first end to said cable first end and exposing said at least one roller.

2. The tailgate lifting assembly of claim 1 further comprising a turnbuckle, said turnbuckle affixed to said second end of said cable.

3. The tailgate lifting assembly of claim 1 further comprising a tubular sleeve extending around said spring.

4. The tailgate lifting assembly of claim 1 wherein said housing is a rectangular housing, said spring contained within said rectangular housing and affixed securely therein by an anchoring bolt, said housing having a top wall and a first and second side wall.

5. The tailgate lifting assembly of claim 4 wherein said top wall extends along said housing until before said at least one roller.

6. The tailgate lifting assembly of claim 1 wherein said second end of said cable is affixed to a side portion of a tailgate.

7. The tailgate lifting assembly of claim 6 further comprising a trailer and a tailgate, said lifting assembly affixed to said trailer, said tailgate hingedly connected to said trailer.

8. The tailgate lifting assembly of claim 2 wherein said turnbuckle further comprises a tubular collar, a first pin and a second pin, said first and second pin threadably engaged within said tubular collar.

9. The tailgate lifting assembly of claim 7 further comprising a tensioning adjustment mechanism interposed between said second end of said cable and said tailgate.

10. The tailgate lifting assembly of claim 6 wherein said spring is a stretchable spring, said tailgate causing said spring to stretch upon lowering of said tailgate.

11. A tailgate lift assembly for a trailer having a tailgate, comprising:
    a trailer having a bed and a first and second side rail;
    a tailgate hingedly affixed to said bed of said trailer;
    a tailgate lifting assembly extending along at least one of said side rails, said tailgate lifting assembly having a stretchable spring retained at a first end to said tailgate lifting assembly by an anchoring bolt, a cable affixed at a first end to a second opposite end of said spring, said cable extending along said tailgate lifting assembly and affixed at the opposite second end to said tailgate;
    at least one roller guide member within said tailgate lifting assembly and affixed therein, said cable guided by said at least one roller guide member.

12. The assembly of claim 11 wherein lowering of said tailgate causes said spring to stretch.

13. The assembly of claim 11 further comprising a tensioning adjustment mechanism interposed between said tailgate and said second end of said cable.

14. The assembly of claim 11 wherein said tailgate lifting assembly is comprised of a first tailgate lifting assembly and a second tailgate lifting assembly, said first tailgate lifting assembly extending along said first side rail of said trailer, said second tailgate lifting assembly extending along said second side rail of said trailer.

15. The assembly of claim 11 wherein said tailgate lifting assembly is further comprised of a housing, said housing extending along said at least one side rail.

16. The assembly of claim 15 wherein said housing is further comprised of a first and second side wall, a top wall and a bottom wall.

17. A tailgate lifting assembly for a trailer having a tailgate, comprising:

a trailer, said trailer having a trailer bed, a first side rail and a second side rail and a tailgate hingedly attached to said tailgate.

a first tailgate lifting assembly extending along said first side rail;

a second tailgate lifting assembly extending along said second side rail;

each of said first and second tailgate lifting assembly having a spring retained at one end to said tailgate lifting assembly, a cable affixed at a first end to the opposite end of said spring, said cable extending along said tailgate lifting assembly and affixed at the opposite end to said tailgate, at least one guide member within said tailgate lifting assembly, said cable guided by said at least one guide member, said assembly including a top wall enclosing said spring and ending at said at least one guide member;

wherein said spring for said first and said second tailgate lifting assembly is stretched upon lowering of said tailgate.

18. A trailer, comprising:

a trailer bed;

a first side rail and a second side rail extending upward from said trailer bed, each of said side rails having an upper section;

a tailgate hingedly attached to said trailer bed;

a first tailgate lifting assembly extending along said upper section of said first side rail;

a second tailgate lifting assembly extending along said upper section of said second side rail;

wherein each of said first and said second tailgate lifting assembly have a housing defining a contained space therein, a spring contained within said defined space of said housing, said spring affixed to said housing at one end, a cable attached to an opposite end of said spring and extending through said defined space of said housing, a roller guide retained within said defined space of said housing, said housing surrounding said spring with two side walls and a top wall, said top wall only extending to said roller, said cable extending around said roller guide, and means for attaching said housing to a top portion of said side rail.

* * * * *